(12) United States Patent
Boles et al.

(10) Patent No.: US 10,018,464 B2
(45) Date of Patent: Jul. 10, 2018

(54) SYSTEM AND METHOD FOR STRUCTURED LIGHT ILLUMINATION WITH FRAME SUBWINDOWS

(75) Inventors: Colby D. Boles, Seattle, WA (US); Raymond Charles Daley, Richardson, TX (US)

(73) Assignee: FlashScan3D, LLC, Richardson, TX (US)

(*) Notice: Subject to any disclaimer, the term of this patent is extended or adjusted under 35 U.S.C. 154(b) by 1832 days.

(21) Appl. No.: 12/991,405

(22) PCT Filed: May 6, 2009

(86) PCT No.: PCT/US2009/043056
§ 371 (c)(1),
(2), (4) Date: Nov. 5, 2010

(87) PCT Pub. No.: WO2010/036403
PCT Pub. Date: Apr. 1, 2010

(65) Prior Publication Data
US 2011/0058023 A1    Mar. 10, 2011

Related U.S. Application Data

(60) Provisional application No. 61/050,903, filed on May 6, 2008.

(51) Int. Cl.
*H04N 13/02*  (2006.01)
*G01B 11/25*  (2006.01)
*G06T 7/521*  (2017.01)

(52) U.S. Cl.
CPC ......... *G01B 11/2513* (2013.01); *G06T 7/521* (2017.01); *G06T 2207/10016* (2013.01)

(58) Field of Classification Search
USPC .......... 348/64, 79–80, 202, 207.1, 262–265, 348/335–369
See application file for complete search history.

(56) References Cited

U.S. PATENT DOCUMENTS 5,155,775 A    10/1992  Brown
6,381,555 B1*  4/2002  Sewell .......................... 702/181
(Continued)

FOREIGN PATENT DOCUMENTS

DE    102004053927 A1    2/2006
EP        1612717 B1     3/2005
(Continued)

OTHER PUBLICATIONS

Becker, Combining Rule-based and Machine Learning Approaches for Shape Recognition: Applied Imagery Pattern Recognition Workshop, 2007. 36th IEEE; Oct. 10-12, 2007; pp. 65-70.
(Continued)

*Primary Examiner* — Jonathan Messmore
(74) *Attorney, Agent, or Firm* — Loza & Loza, LLP; Jessica Smith

(57) ABSTRACT

A structured light imaging (SLI) system includes a projection system, image sensor system and processing module. The projection system is operable to project a single SLI pattern into an imaging area. The image sensor system is operable to capture images of a 3D object moving through the imaging area. The image sensor system outputs a subset of camera pixels corresponding to a subwindow of a camera frame to generate subwindow images. The processing module is operable to create a 3D surface map of the 3D object based on the subwindow images.

16 Claims, 11 Drawing Sheets

(56) References Cited

U.S. PATENT DOCUMENTS

| | | |
|---|---|---|
| 6,611,343 B1 | 8/2003 | Frankowski |
| 7,212,330 B2 | 5/2007 | Seo et al. |
| 7,292,711 B2 | 11/2007 | Kiraly et al. |
| 7,599,531 B2 | 10/2009 | Hauke et al. |
| 8,224,064 B1 * | 7/2012 | Hassebrook et al. ......... 382/154 |
| 2005/0249388 A1 | 11/2005 | Linares |
| 2006/0045316 A1 | 5/2006 | Hauke et al. |
| 2006/0098089 A1 | 5/2006 | Sofer |
| 2006/0120576 A1 | 6/2006 | Chen |
| 2007/0273957 A1 | 11/2007 | Zalevsky et al. |
| 2007/0299338 A1 | 12/2007 | Stevick et al. |
| 2008/0011856 A1 * | 1/2008 | Bremer et al. ........... 235/462.07 |
| 2008/0253620 A1 | 10/2008 | Hashimoto |
| 2009/0103777 A1 | 4/2009 | Hassebrook et al. |
| 2009/0208070 A1 | 8/2009 | Fourre et al. |
| 2011/0038513 A1 * | 2/2011 | Du et al. ...................... 382/124 |

FOREIGN PATENT DOCUMENTS

| | | |
|---|---|---|
| JP | 2004192633 A | 11/2003 |
| JP | 2007179267 A | 12/2005 |
| JP | 2007310429 A | 11/2007 |
| WO | 2007/050776 A2 | 5/2007 |

OTHER PUBLICATIONS

International Search Report, Application No. PCT/09/43056; dated Apr. 1, 2010; pp. 1-3.

Thibaut Weise, et al, "Fast 3D Scanning with Automatic Motion Compensation", CVPR '07, IEEE Conference on Computer Vision and Pattern Recognition, Jun. 18-23, 2007, 8 pages, Minneapolis, MN, US.

European Search Report; Application No./Patent No. 09816623.4-2218 / 2286368, PCT/US2009043056, dated Mar. 19, 2012, 5 pages.

* cited by examiner

SYSTEM AND METHOD FOR STRUCTURED LIGHT ILLUMINATION WITH FRAME SUBWINDOWS

CROSS-REFERENCE TO RELATED PATENTS

This US patent application claims priority under 35 U.S.C. § 119 to a provisionally filed patent application entitled, "Subwindowing 3D Object Scanning System and Method," having a provisional filing date of May 6, 2008, and a provisional application Ser. No. 61/050,903, and is hereby incorporated by reference.

STATEMENT REGARDING FEDERALLY SPONSORED RESEARCH OR DEVELOPMENT

The U.S. Government has a paid up license in this invention and the right in limited circumstances to require the patent owner to license others on reasonable terms as provided for by the terms of Contract No. W91CRB-09-C-0005 awarded by the US Army RDECOM ACQ CTR.

INCORPORATION-BY-REFERENCE OF MATERIAL SUBMITTED ON A COMPACT DISC

Not applicable.

BACKGROUND OF THE INVENTION

Technical Field of the Invention

This invention relates structured light illumination and in particular to systems and methods for implementing structured light illumination with frame subwindows.

Description of Related Art

Structured light illumination (SLI) is a known method for extracting 3D surface information. Current SLI systems consist of a projector that projects an SLI pattern onto a 3D object while one or more cameras capture images of large areas of the 3D object. This design presents a number of challenges to miniaturization and cost reduction, namely projector size and camera cost. Cameras that are capable of imaging large areas in high resolution do not necessarily have a fast frame rate, introducing a problem when the 3D object has movement. Although the cameras can be quite small, they still require an optical path length to the 3D object proportional to the width of the image area. This optical path length also holds true for the DLP projector as well. A typical DLP projector is also physically significant in size. All of these factors contribute to a larger system size than would be practical for a portable SLI system.

Furthermore, fast, high resolution cameras have a significant cost. The cameras may also require more expensive, high bandwidth connections to the processor such as Firewire and Camera Link. DLP projectors can also be a significant expense.

As such, there is a need for an improved SLI system with fast, high resolution image capture that is operable with moving 3D objects and has a reduced size and cost.

DETAILED DESCRIPTION OF THE INVENTION

Figure 1:
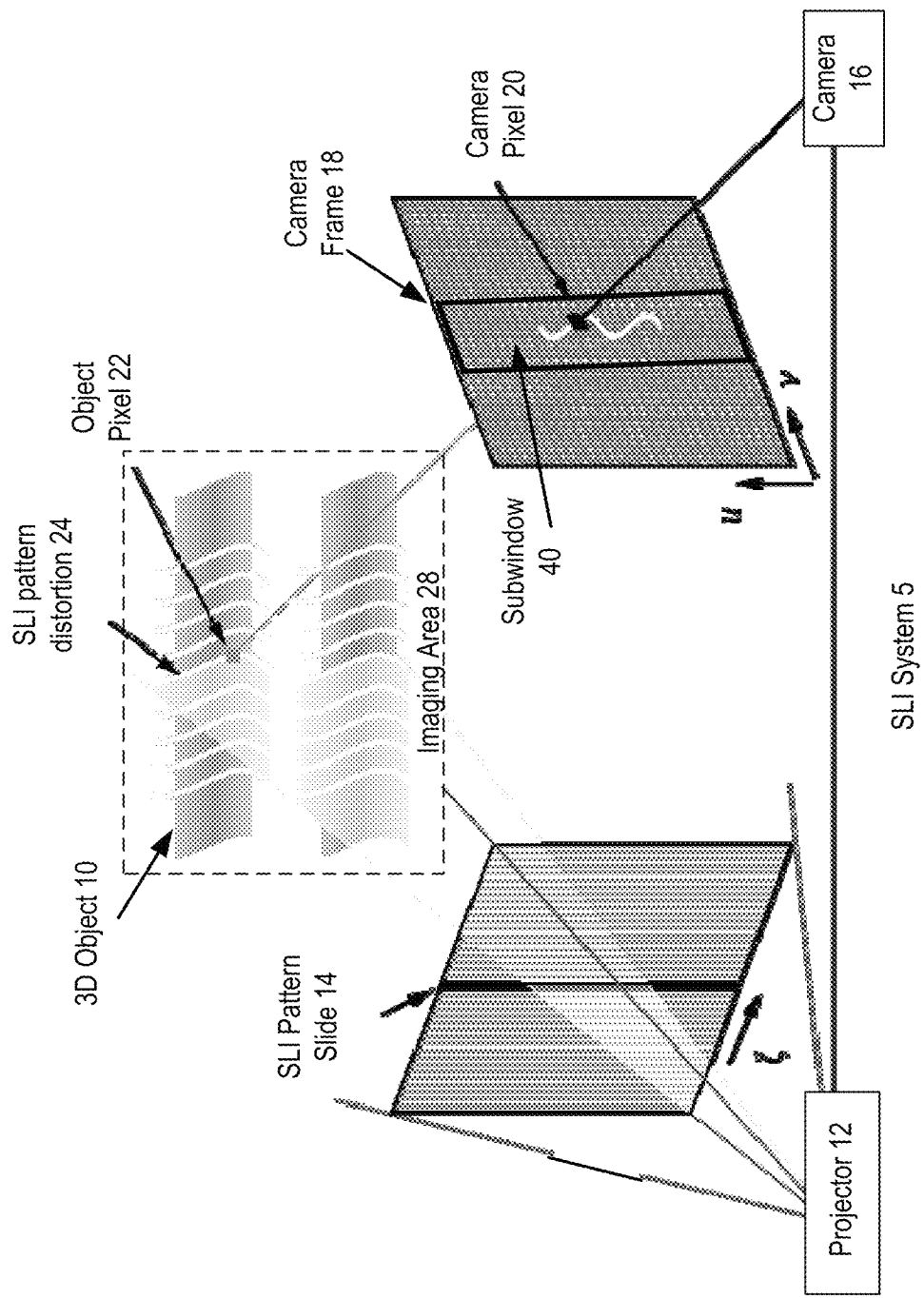
FIG. 1 illustrates a schematic block diagram of an embodiment of an SLI system.

FIG. 1 illustrates a schematic block diagram of an embodiment of an SLI system 5 in accordance with the present invention. The SLI system 5 includes an SLI pattern projector and camera 16. The SLI pattern projector includes a DLP projector, LCD projector, LEDs, or other type of projector. The camera 16 includes one or more digital cameras or image sensors operable to capture digital images.

In operation, the SLI pattern projector 12 projects focused light through an SLI pattern slide 14 onto 3D object 10 in imaging area 28. The SLI pattern is distorted by the surface variations of 3D object 10 as seen with SLI pattern distortion 24. While the SLI pattern is projected onto 3D object 10, a camera 16 captures an image of the 3D object with the SLI pattern distortion 24. The camera 16 generates a frame 18 composed of a matrix of camera pixels 20 wherein each camera pixel 20 includes image data for a corresponding object point 22 on the 3D object 10.

In many SLI systems, multiple SLI patterns are projected onto the 3D object 10 while camera 16 captures an image of the 3D object 10 for each projected pattern. One type of SLI technique is phase measuring profilometry (PMP). With PMP, a fixed number N of phase shifted patterns of a known spatial frequency are projected onto the 3D object. The frequency of the pattern is defined as the number of pattern cycles per inch. In theory, the minimum number of phase shifted patterns required for 3D scans is three.

Figure 2:
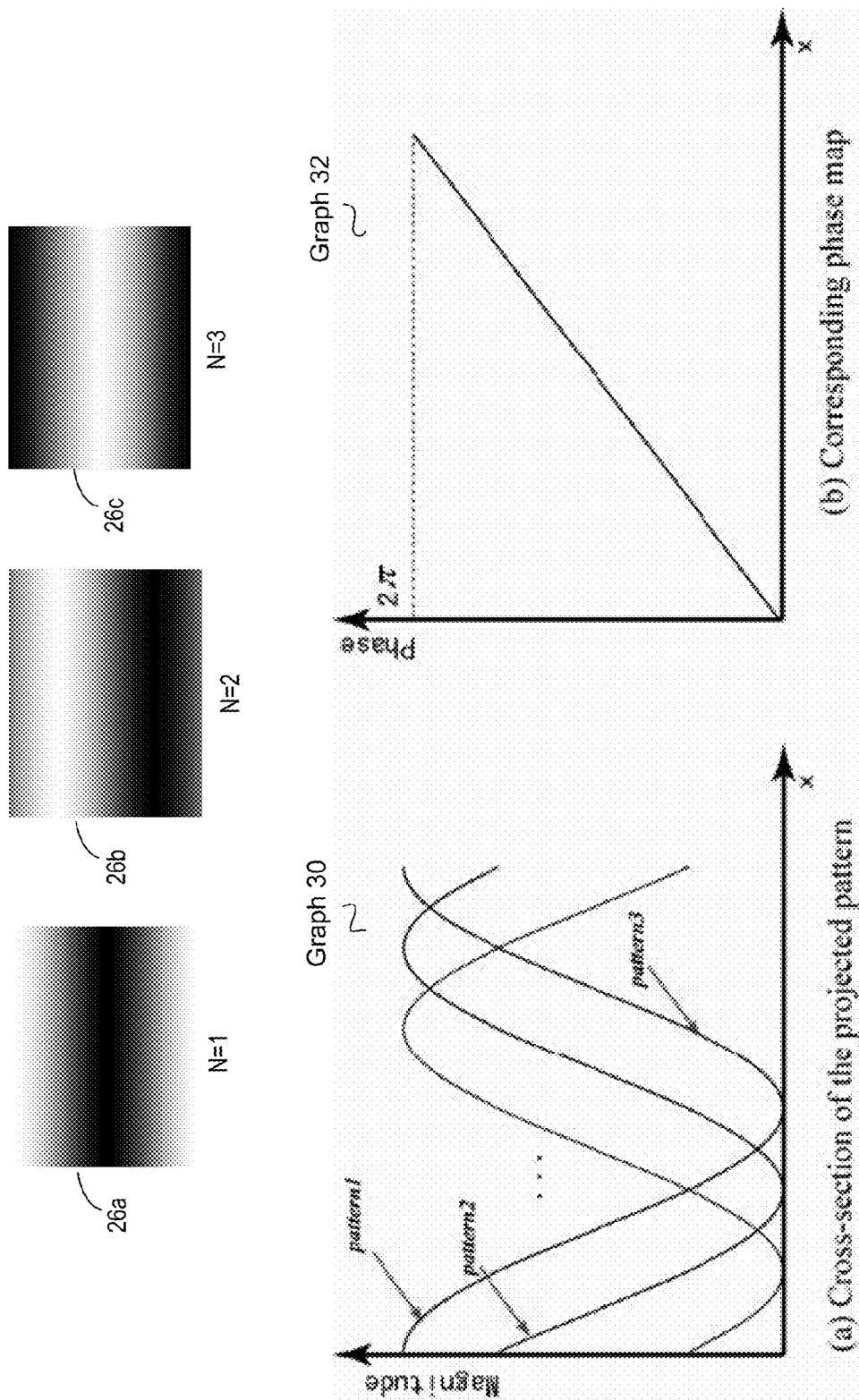
FIG. 2 illustrates a schematic block diagram of a PMP technique in an SLI system.

FIG. 2 illustrates an example of PMP technique in SLI systems. In PMP, phase shifted sine wave patterns, such as sine wave patterns 26a-c are used as the SLI patterns. Graph 30 illustrates the magnitude versus phase of the three sine wave patterns. Graph 32 illustrates an ideal phase map of a flat scanned surface (in the absence of sensor noise) computed from the three phase shifted, sine wave patterns. The phase map in graph 32 can be used to calculate 3D world coordinates using the known calibration matrices of camera 16 and SLI projector 12.

In operation, the phase shifted sine wave patterns are projected onto the 3D object while camera 16 captures images of the 3D object 10. Surface depth can be extracted from the amount of deviation to the projected phase shifted sine wave patterns on the 3D objects. A projected phase shifted sign wave pattern is expressed as:

$$I n(x^p, y^p) = A^p + B^p \cos(2\pi f y^p - 2\pi n/N),$$

where $A^p$ and $B^p$ are constants of the projector, f is the frequency of the sine wave, and $(x^p, y^p)$ is the projector coordinate. The subscript n represents the phase-shift index. The total number of phase shifts is N. The topology information of the 3D object can be mathematically determined by:

$$I_n(x^c, y^c) = A(x^c, y^c) + B^c(x^c, y^c) \cos(\Phi(x^c, y^c) - 2\pi n/N)$$

The term $\Phi(x^c, y^c)$ represents the phase value at camera pixel location $(x^c, y^c)$ of the frame with a captured sine wave pattern. The term $\Phi(x^c, y^c)$ can be computed as follows:

$$\phi = \arctan\left[\frac{\sum_{n=1}^{N} I_n \sin(2\pi n/N)}{\sum_{n=1}^{N} I_n \cos(2\pi n/N)}\right]$$

Once the value of $\Phi(x^c, y^c)$ is computed the projector coordinate $y^p$ can be recovered as $y^p = \Phi(x^c, y^c)/(2\pi f)$. Hence, with the knowledge of the $\Phi(x^c, y^c)$, $y^p$ and the camera and projector calibration matrices, the 3D world coordinates of the object points can be computed. Though phase shifted sine wave patterns are described in this example, other PMP phase shifted patterns may be implemented, such as triangular waves, square waves, gradients, stripes, etc. In addition, multi-frequency phase shifted patterns may be implemented. The PMP phase shifted patterns may also include different colors and layers of patterns.

The major advantage of the PMP technique in 3D reconstruction is good surface resolution. PMP methods are described in, Veera Ganesh Yalla and L. G. Hassebrook, "Very High Resolution 3-D Surface Scanning using Multi-frequency Phase Measuring Profilometry," edited by Peter Tchoryk, Jr. and Brian Holz, SPIE Defense and Security, Spaceborne Sensors II, Orlando, Fla., Vol. 5798-09, (Mar. 28, 2005), which is incorporated by reference herein and Jielin Li, L. G. Hassebrook and Chun Guan, "Optimized Two-Frequency Phase-Measuring-Profilometry Light-Sensor Temporal-Noise Sensitivity," JOSA A, 20(1), 106-115, (2003), which is incorporated herein, and PCT Published Application No. WO 2007050776, entitled "System and Method for 3D Imaging Using Structured Light Illumination," by Laurence G. Hassebrook, Daniel L. Lau, and Henry G. Dietz, which is incorporated herein.

For better depth resolution and reducing reconstruction errors, generally more than four PMP phase shifted patterns are needed, e.g. N>3. In fact, the larger the number of PMP phase shifted patterns used, the lower is the error in 3D reconstruction. Due to the large number of frames needed and the high resolution of the frames, the speed to acquire an image set in known PMP systems is not optimal, especially for 3D objects that move. Thus, it would be advantageous to have an SLI system with increased frame rates.

A problem described in this specification is that in an SLI system, frame rates for digital imaging systems are limited by the camera's pixel clock rate. The pixel clock rate is the number of pixels per second output by the camera. Since the resolution of a camera is measured by the pixels per square inch (PPI) or image resolution by dots per square inch (DPI), higher resolution images take longer to output for a given pixel clock rate. The frame rate fc, of a given camera is:

$$f_c = f_p/AR^2$$

where R equals the required image resolution (DPI), A equals the frame area (in$^2$) and $f_p$ is the pixel clock rate (Hz). The frame rate is proportional to the pixel clock rate and inversely proportional to the image resolution. The pixel clock rate is the rate in pixels/second for outputting data for a pixel. For example, most camera technologies today have a pixel clock rate of 48 MHz or 96 MHz. When an SLI system requires a 6"×8" frame area to capture a 3D object and the desired resolution is 600 dpi, then the frame rate is approximately 5.5 frames/second at a pixel clock rate of 96 MHz. When 8 or more frames are desired, it may take up to 2 seconds to capture the necessary images with a frame rate of 5.5 frames/second. This length of time increases the likelihood that the 3D object may move, especially in biometric applications such as fingerprinting and facial recognition.

The required frame rate to avoid errors in reconstruction increases in proportion to the magnitude of movement of the 3D object. If the movement is modeled as a constant velocity, then the frame rate, $f_c$, needed to keep the apparent movement smaller than the required resolution R requires:

$$f_c \approx R$$

If this movement is modeled as Brownian, then $f_c$ is proportional to the square root of R, such that:

$$f_c \sqrt{R^{0.5}}$$

Substituting terms we find that the required pixel clock rate to for a given resolution and object size is:

$$f_p \approx AR^3 \text{(constant velocity), or } f_p \approx AR^{2.5} \text{(brownian)}$$

As such, the required pixel clock rate of the camera system increases as the third power of the required resolution for moving 3D objects. Since such pixel clock rates become impractical to achieve higher resolutions, most SLI systems operate at low frame rates and do not tolerate movement by the 3D object, or are inherently low resolution. Any movement of the 3D object of even one pixel (1/600") between images can cause substantial artifacts and loss of accuracy in the measurement.

FIG. 1 illustrates a subwindow 40 that enables an increase in frame rate for a given pixel clock rate and image resolution. A camera frame 18 includes a matrix of camera pixels 20. The number of pixels in a camera frame 18 is determined by its "pixel count". For example, a 640×480 image would have 307,200 pixels, or approximately 300 kilopixels while a 3872×2592 image would have 10,036,224 pixels, or approximately 10 megapixels. The subwindow 40 includes a subset of the camera pixels 20 in a camera frame 18. The subwindow 40 has the same camera resolution, PPI or image resolution DPI, as generated for the overall camera frame 18. The dimensions of the image generated by the subwindow 40 are smaller than for the image generated by the camera frame 18. For example, the camera frame 18 may include 21,000 camera pixels 20 and generate a 5"×7" image with 600 dpi. The subwindow 40 may include 2100 camera pixels 20 and generate a 0.5"×7" image with 600 dpi.

Figure 3:
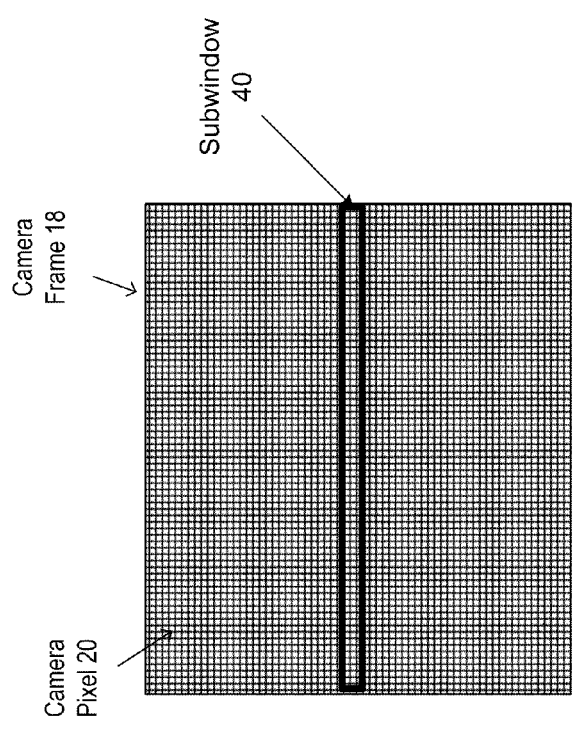
FIG. 3 illustrates a schematic block diagram of an embodiment of a subwindow of a camera frame in an SLI system.

FIG. 3 illustrates a schematic block diagram of an embodiment of subwindow 40 of camera frame 18 in more detail. The subwindow 40 of camera pixels 20 is a subset of the camera pixels 20 in a camera frame 18, wherein the subset includes fewer pixels than those processed and output for the camera frame 18. The subwindow 18 includes only the pixels corresponding to an image area smaller than the image area captured by the entire camera frame 18. In use, the camera is programmed to output only the image data for the camera pixels 20 in the subwindow 40 during a frame period. This reduces the number of camera pixels 20 required to be processed and output during a frame period. As such, the frame period is shortened. Using this technique, the frame rate may be increased substantially for a given image resolution and pixel clock rate.

Figure 4:
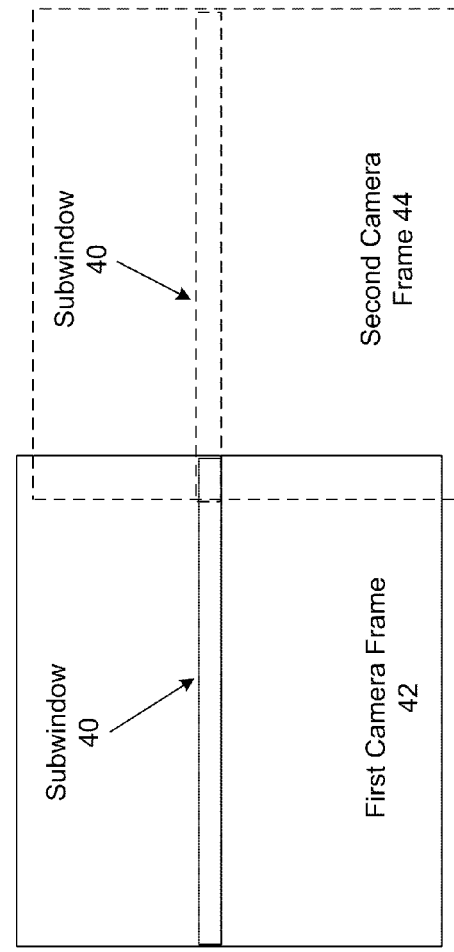
FIG. 4 illustrates a schematic block diagram of an embodiment of subwindows from multiple camera frames in an SLI system.

FIG. 4 illustrates a schematic block diagram of an embodiment of multiple subwindows. When multiple cameras are used in an SLI system, each camera may be programmed to output a subwindow 40 of the camera pixels 20. In an embodiment, the subwindows 40 for each camera frame generate a substantially overlapping images of the 3D object. The subwindow 40 for each camera frame may have a different number of pixels horizontally due to redundant overlap. For example, the first camera frame 42 may have a subwindow 40 with less pixels than the subwindow 40 in the second camera frame 44. In addition, the camera frames 42 and 44 may not be aligned.

The subwindows 40 shown in FIGS. 1-4 are rectangular and are long narrow strips. A subwindow 40 may include other shapes, such as circles, pentagons, hexagons, irregular pattern, combination of patterns, stripes, etc., depending on the application.

Figure 5:
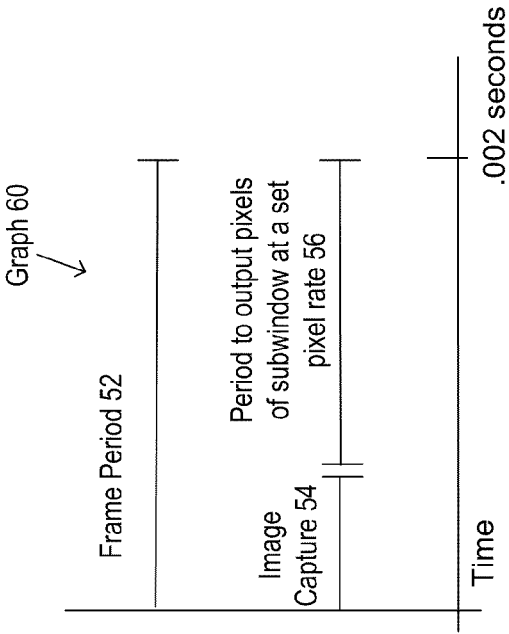
FIG. 5 illustrates exemplary graphs describing differences in frame periods with use of subwindows.
Figure 5:
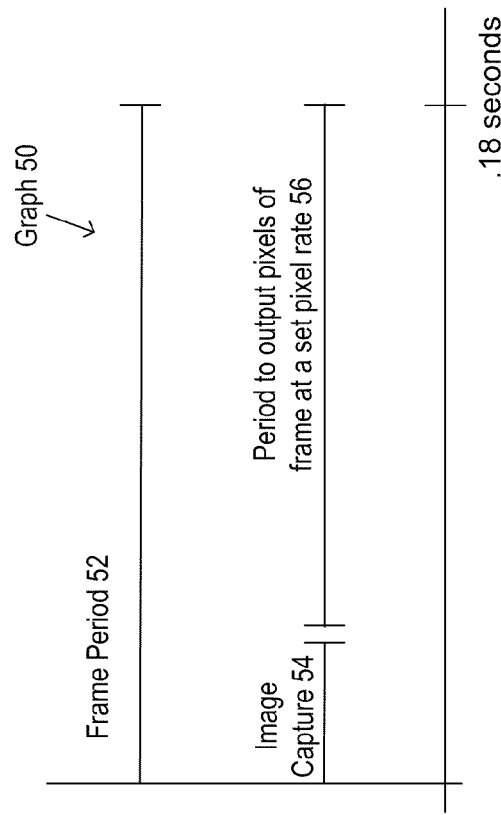

FIG. 5 illustrates a schematic of two graphs that exemplify the advantage of using subwindows 40. In Graph 50 (not to scale), the frame period 52 includes the time for image capture 54 and the period 56 to output pixels of a camera frame at a set pixel rate. The time for image capture 54 varies but is on the order of 10 usec. The period to output pixels 56 is based on the example described above for a 6"×8" frame area with a resolution of 600 dpi and a pixel clock rate of 96 MHz. For this example, the frame rate is approximately 5.5 frames/seconds and the frame period is approximately 0.18 seconds. The period to output pixels of 0.18 seconds is almost four orders of magnitude greater than the image capture time of 10 usec. As such, the frame rate depends mostly on the period to output pixels.

Graph 52 (not to scale) illustrates an example of a frame period with use of a subwindow 40. In this example, again, the camera frame has a 6"×8" frame area with a resolution of 600 dpi, and the camera has a pixel clock rate of 96 MHz. In an embodiment, a subwindow of a small rectangular portion of the image with dimensions of 0.06"×8" is selected. During a frame period, only the pixels in this subwindow are processed and output by the camera. By reducing this image area A by a factor of 100, the frame rate, $f_c \approx f_p/AR^2$, with this subwindow equals approximately 530 frames/sec., an increase of almost 100 times from the example in Graph 50, for the same resolution and pixel clock rate. The frame period is approximately 0.002 seconds.

The use of subwindows thus increases the frame rate for a given pixel clock rate and image resolution. The use of subwindows may be incorporated into any type of SLI system, such as shown in FIG. 1.

In an embodiment, the use of subwindows allows for an SLI system to be operable with moving 3D objects. As describe previously, PMP SLI systems require a minimum number of images of each object point to perform a 3D image reconstruction. The proposed SLI system uses its increased frame rate to capture a sufficient number of images of each object point on the moving 3D object within the smaller dimensions of the subwindow. In addition, the images captured by this SLI system have reduced motion blur such that 3D reconstruction within desired error rates and quality standards may be performed.

Figure 6:
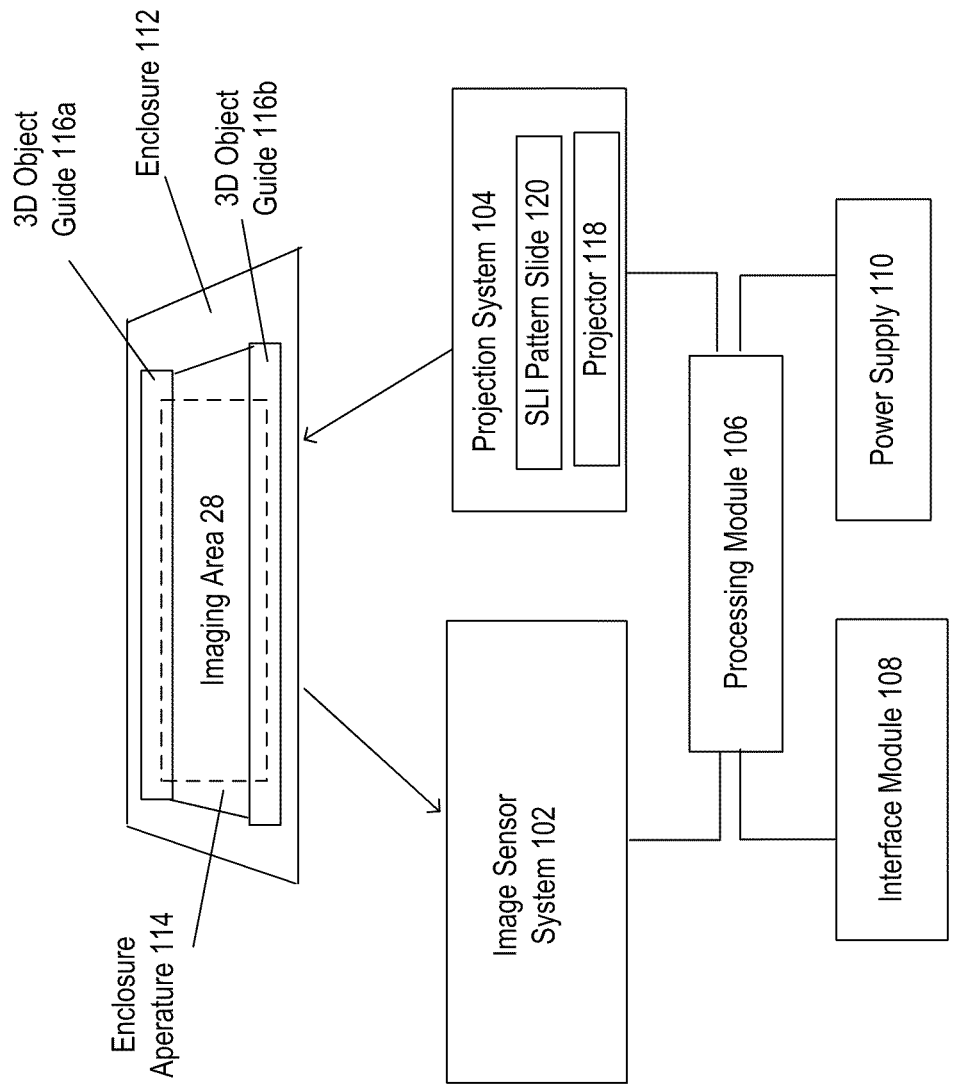
FIG. 6 illustrates a schematic block diagram of an embodiment of an SLI system

FIG. 6 illustrates a schematic block diagram of an embodiment of an SLI system 100. The SLI system 100 includes an image sensor system 102, projection system 104, processing module 106, interface module 108 and power supply 110. The image sensor system 102 includes one or more image sensors operable to capture images of 3D object 10. Projection system 104 includes one or more projectors 118 and one or more SLI pattern slides 120. The power supply 110 is coupled to the image sensor system 102, projection system 104 and processing module 106. The interface module 108 provides a display and user interface, such as keyboard or mouse, for monitoring and control of the SLI system 100 by an operator. The interface module 108 may include other hardware devices or software needed to operate the SLI system 100 and provide communication between the components of the SLI system 100.

Processing module 106 is operable to control the image sensor system 102 and projection system 104. In general, the processing module 106 includes one or more processing devices, such as a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module 34 includes a memory that is an internal memory or an external memory. The memory of the processing module 106 may each be a single memory device or a plurality of memory devices. Such a memory device may be a read-only memory, random access memory, volatile memory, non-volatile memory, static memory, dynamic memory, flash memory, cache memory, and/or any device that stores digital information. When processing module 106 may implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. Processing module 106 may execute hard coded and/or operational instructions stored by the internal memory and/or external memory to perform the steps and/or functions illustrated in FIGS. 1 through 15 described herein. The processing module 106 and the interface module 108 may be integrated into one or more devices or may be separate devices.

The SLI system 100 also includes an enclosure 112 that forms an enclosure aperture 114. 3D object guides 116a and 116b are positioned on the sides of the enclosure aperture 114. The 3D object guides 116a-b are operable to guide a 3D object over the aperture 114. In an embodiment, the 3D object guides 116a and 116b guide the 3D object to move substantially along one axis. In an embodiment, the 3D object guides 116a-b are rollers and the 3D object rests on the rollers. The rollers turn in response to movement by the 3D object and help guide the 3D object's movement across the aperture 114. Other types of 3D object guides 116 may be implemented instead of or in addition to the rollers.

In operation, the 3D object 10 moves across the aperture 114. While the 3D object 10 moves across the aperture 114, projection system 104 projects an SLI pattern through the enclosure aperture 114 and onto the 3D object. The image sensor system 102 captures a series of images of the 3D object 10. Thus, in this embodiment, the SLI system 100 is operable for the 3D object 10 to move through imaging area 28.

In an embodiment, the imaging area 28 includes the enclosure aperture 114 and 3D object guides 116a-b or portions thereof. The subwindow 40 has dimensions equal to or smaller than the dimensions of imaging area 28. In an embodiment, the dimensions of the subwindow 40 include the enclosure aperture 114 and also the 3D object guides 116. The image sensor system 102 outputs only the camera pixels 20 corresponding to the subwindow 40.

Figure 7:
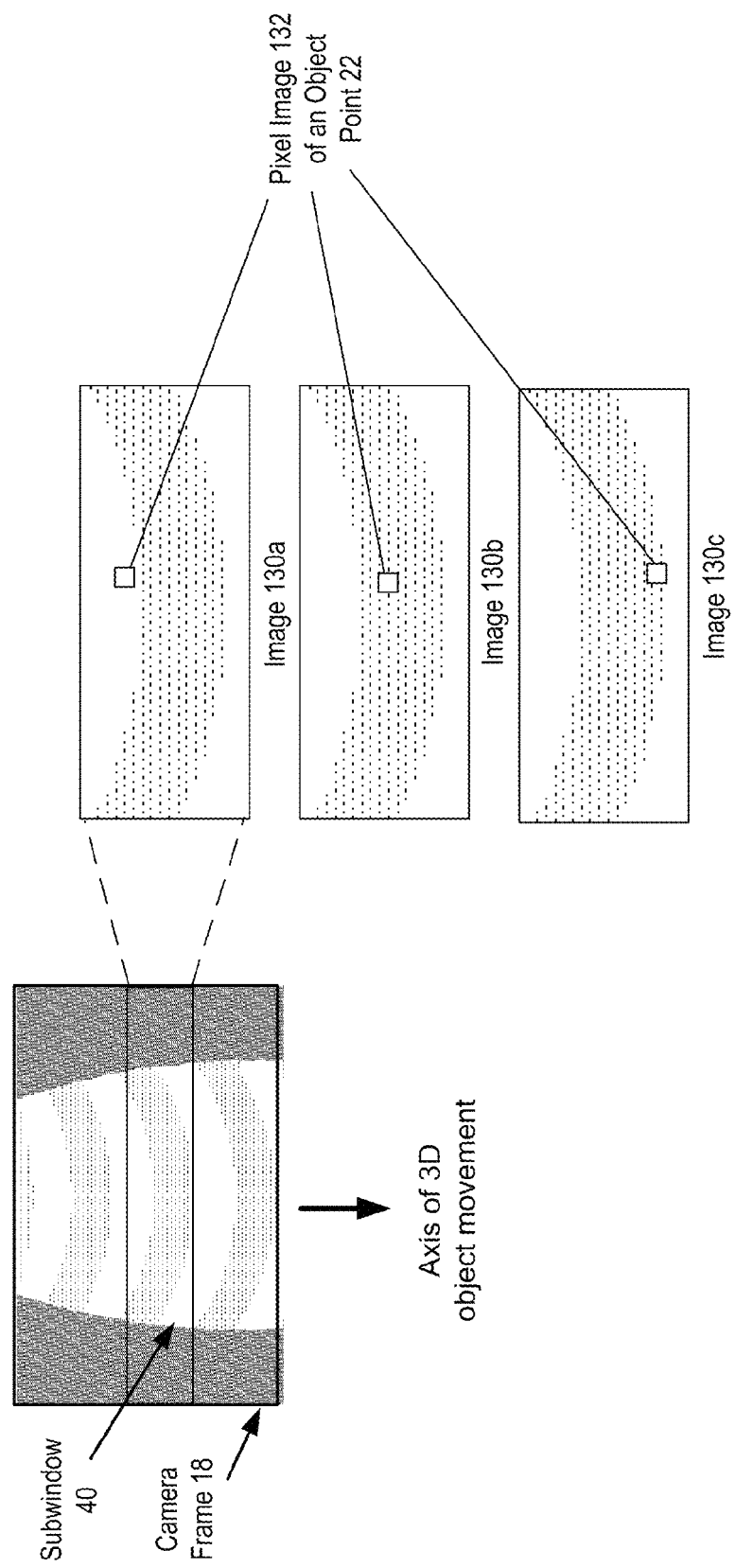
FIG. 7 illustrates an embodiment of a method of operation of an SLI system for processing subwindows.

FIG. 7 illustrates an embodiment of a method of operation of an SLI system for processing subwindows. FIG. 7 illustrates a camera frame 18 and subwindow 40 of the camera frame 18. In this embodiment, the 3D object 10 is a fingertip. The projection system 104 projects an SLI sine wave pattern onto the fingertip in the imaging area 28. In an embodiment, the SLI sine wave pattern stripes should be approximately perpendicular to the movement of the 3D object and parallel to the shortest dimension of the subwindow. The fingertip moves across the enclosure aperture 114 and distorts the SLI sine wave pattern due to variations in surface topology. The image sensor system 102 captures a series of images of the fingertip as it moves through the imaging area 28. Only the camera pixels corresponding to the subwindows 40 of each of the images are processed or output during a frame period. The images from the subwindows 40 are shown as images 130a-c. A schematic pixel image 132 of an object point 22 of the 3D object 10 is illustrated in each of the subwindow images 130a-c. As seen in the subwindow images 130a-c, the object point 132 moves through the SLI sine wave pattern such that subwindow images 130a-c capture a pixel image 132 of the object point 22 with distortions of different parts of the cycle of the SLI sine wave pattern. This creates a similar effect to that of images of multiple phase shifted sine wave patterns projected onto an unmoving object point 22 except that the movement of the 3D object must be considered during processing to compute the 3D world coordinates as discussed in more detail below.

Due to the smaller number of pixels in the subwindows from the camera frame, the image sensor system has fewer pixels to output and so a shorter frame period. As the frame rate is increased, the image sensor system 102 is operable to capture more subwindow images of the 3D object. This higher frame rate decreases motion blur due to the movement of the 3D object while still providing a sufficient number of images of each object point on the 3D object to generate a PMP 3D phase map.

Various factors are considered to determine the dimensions of a subwindow of the camera frame. One factor is the frame rate. When the movement of the 3D object occurs substantially in one axis, the parallel axis or dimension of the subwindow should be sized sufficiently that at the frame rate, motion blur due to the movement of the 3D object is reduced sufficiently to generate 3D reconstruction within desired error rates and quality parameters. In addition, the subwindow dimensions at the frame rate must still provide a sufficient number of images of each object point on the 3D object to perform 3D reconstruction within desired error rates and quality parameters.

The frame rate also depends on the image resolution (DPI) and dimensions of the subwindow. When a higher resolution image is required, a subwindow with smaller dimensions and fewer pixels may be desired to maintain a certain frame rate. When the subwindow has smaller dimensions, the area of the 3D object imaged may be increased by implementing multiple cameras that generate images with overlapping subwindows, as shown in FIG. 4. In another embodiment, the image resolution may need to be lower. Then the subwindow may have larger dimensions to maintain the same frame rate.

In addition to desired frame rate, other factors are considered to determine the dimensions of the subwindow of a camera frame. For example, the velocity of the 3D object as it moves through the imaging area is another factor. The image sensor system 102 must be able to capture a sufficient number of images of each object point on the 3D object to perform the 3D reconstruction. For PMP, at least 3 different images are generally needed of an object point 22 though more images are desirable. The size of the subwindow may need to be adjusted depending on the velocity of the 3D object and the frame rate. For example, with a frame rate of 500 frames/sec and a 3D object velocity of 2 inches/sec., the subwindow would need to be 0.012 inches in height to capture three subwindow images or 0.04 inches to capture ten subwindow images of an object point 22. Thus, the subwindow size also depends on the desired number of subwindow images of an object point for a particular frame rate and 3D object velocity.

Another factor to consider is the frequency of the SLI sine wave pattern. In an embodiment, the subwindow image needs to include at least one cycle of the SLI sine wave pattern. In general, the cycle size of the SLI pattern may be adjusted to accommodate the desired dimensions of the subwindow. However, in certain applications, a very small cycle size may create errors depending on projector resolution and other optical limitations. When the sine wave is too fine, it may be difficult to differentiate distortions and discontinuities in the sine wave pattern. A ridge on the 3D object may create a distortion 360 degrees out of phase and thus the ridge would not be differentiated in the sine wave pattern. For example, if an SLI sine wave pattern has a frequency between 30 and 40 cycles per inch, the subwindow height would need to be at least 0.025 inches to include one cycle of the SLI sine wave pattern. In an embodiment, additional number of cycles of SLI sine wave patterns may be desired.

Another factor to consider is the aspect ratio for the image sensor system 102. In an embodiment, it may be desirable for the SLI system 100 to remain within predetermined dimensions.

The size of the 3D object also needs to be considered. For example, suppose the 3D object is a fingertip. The maximum width of a large fingertip may be estimated at 1.5 inches. Then the width of the subwindow 40 needs to be 1.5 inches to image the width of a large finger. Other factors may also be considered in determining the dimensions of a subwindow 40.

Depending on the implementation and the various factors, either one camera may be implemented that generates a single subwindow image with the desired dimensions or multiple cameras may be implemented that generate a plurality of overlapping subwindow images with the desired dimensions.

In another embodiment, instead of use of a subwindow of a camera frame, a camera sensor may be specifically manufactured to generate an image with predetermined dimensions or aspect ratio. The aspect ratio of the image for the specialized camera would be determined based on the various above factors. Thus, the specialized camera would output pixels for the entire camera frame but the camera frame has been designed to dimensions meeting the above described criteria. As such, the image from the camera frame and frame rate are sufficient to reduce motion blur errors due to the movement of the 3D object while still providing a sufficient number of images of each object point on the 3D object to generate a PMP 3D phase map within desired error rates and quality standards.

In another embodiment, an array of cameras with a commercial aspect ratio may be used to generate an image size with an aspect ratio meeting the above described criteria. For example, 10 cameras each with a 5"×7" aspect ratio may be positioned in a long column, such that when their individual images are stitched together, it creates an image with a 5"×70" aspect ratio. Again, the size of the image at the frame rate must be determined such that enough images of each object point are captured to generate a PMP 3D phase map while sufficiently fast to reduce motion blur due to the movement of the 3D object.

In an embodiment, when the 3D object moves substantially in one axis, the parallel axis or dimension of the image or subwindow is on an order of magnitude 10 to 100 times smaller than the 3D object.

Figure 8:
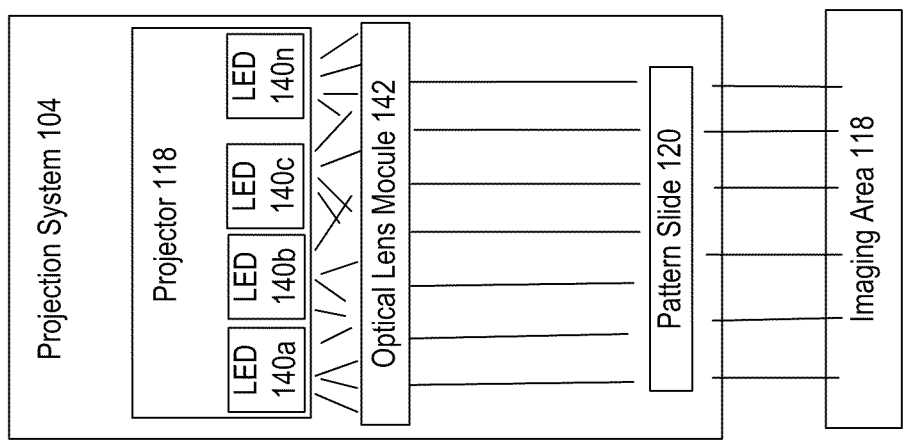
FIG. 8 illustrates a schematic block diagram of an embodiment of a projection system in an SLI system.

FIG. 8 illustrates a schematic block diagram of an embodiment of projection system 104. In this embodiment, the projector 118 includes an array of high intensity light emitting diodes (LED) 140a-n. The LEDs 140a-n are triggered for a pulse duration sufficient to provide ample exposure at the highest frame rate of the image sensor system 102, while minimizing the duration to avoid motion blur of the 3D object during the exposure. The use of an array of LEDs rather than a DLP projector in this embodiment reduces hardware cost and size of the SLI system 100. Using a high intensity LED array as a flash unit also allows for increased image signal to noise ratio (SNR) and shorter exposure times.

The projection system 104 also includes optical lens module 142. The optical lens module 142 projects the light from the LEDs through the SLI pattern slide and focuses the SLI pattern into the imaging area 28. In an embodiment, the optical lens module 142 focuses light only in the axis perpendicular to the LED array, achieving further efficiency in light output by only projecting light in an aspect ratio that matches that of the pattern slide. For example, the optical lens module may be a cylindrical lens.

Figure 9:
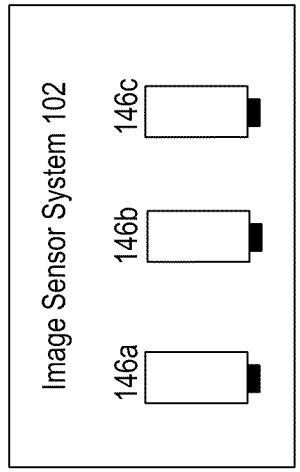
FIG. 9 illustrates a schematic block diagram of an embodiment of an image sensor system in an SLI system.

FIG. 9 illustrates a schematic block diagram of an embodiment of image sensor system 102. The image sensor system 102 includes one or more image sensors 140. In an embodiment, the image sensors are CCD (Charge coupled device) camera modules, CMOS (Complementary metal-oxide-semiconductor) camera modules, or other type of image sensor modules operable to output a subwindow 40 of a camera frame 18. For example, CMOS imaging sensor technology provides support of direct camera pixel access, and thus would allow subwindowing. In another embodiment, the image sensors 140 are specifically manufactured to generate an image with predetermined dimensions or aspect ratio of the subwindow 40 described herein. The specialized camera outputs image data for pixels for the entire camera frame but the camera frame has been designed to dimensions of the subwindow 40. The image sensors 140 include a high speed data interface, such as USB interface, and include a trigger input for synchronization with the projection system 104.

Figure 10:
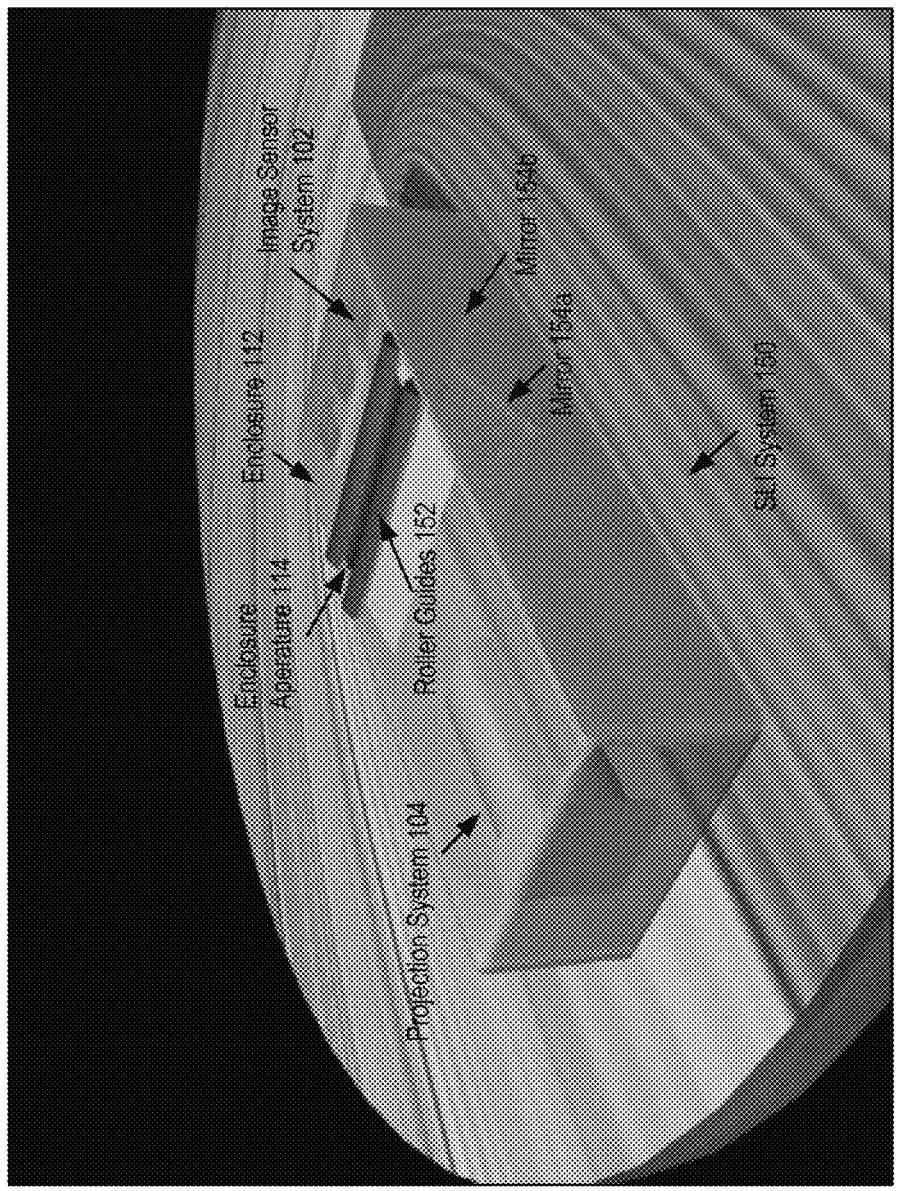
FIG. 10 illustrates a schematic block diagram of an embodiment of an SLI system.

FIG. 10 illustrates a schematic block diagram of an embodiment of an SLI system 150. This embodiment illustrates a portable SLI system 150 for biometrics, such as capturing fingerprints. In the embodiment, the image sensor system 102 includes three CMOS or CCD cameras with a resolution of 1024×768. The three cameras have been programmed to output an overlapping subwindow image having rectangular dimensions. The width corresponds to a finger width but the height corresponds to only a fraction of an inch, e.g. height of a fingertip. In an embodiment the subwindow has dimensions of about 1.5"×0.1" (0.2 Megapixels), e.g. each camera outputs a subwindow 40 with dimensions of approximately 0.5"×0.1". Because the three cameras have such a small subwindow size, the 3D object may be closer to the cameras. As such, the SLI system 150 is smaller and portable. In another embodiment, the image sensor system 102 includes specifically manufactured camera operable to generate and output an image with an aspect ratio of 1.5"×0.1" with similar resolution and frame rate.

In SLI system 150, projector system 104 includes 30 Green Luxeon Rebel LEDs driven at 700 mA in 5 strings consisting of 6 series LEDs. The combined luminous flux is on the order of 5400 lumens. The projector system 104 includes a single SLI sine wave grating pattern slide. An optical lens system focuses the light from the LEDs onto a narrow 1.5"×0.1" rectangle of similar size to the overlapping subwindows 40. Because the subwindow 40 is so narrow in this embodiment, the light is focused only in the y axis to form a line of focused pattern in the subwindow 40 of the camera frame 18.

To adjust the dimensions of the enclosure 112, mirrors 154a and 154b are implemented in SLI system 150. Mirror 150a is angled to reflect the SLI pattern projection through the enclosure aperture 114 onto the 3D object while mirror 150b is angled to reflect the images from 3D object to the image sensor system 102. The mirrors 154a-b help to adjust the dimensions of the enclosure 112 to a preferable form factor.

The enclosure 112 also includes roller guides 152. The roller guides 152 are positioned on either side of the enclosure aperture 114.

In operation of SLI system 150, a subject places a finger on the roller guides 152. The subject moves their finger causing the roller guides 152 to turn and guide the finger across the enclosure aperture 114. The image sensor system 102 images the subject's finger as it moves across the enclosure aperture 114. During each frame period, the projection system 104 synchronously pulses the LED light source during the camera period of image capture. The short pulses of LED light help to reduce motion blur. The image sensor system 102 outputs only pixels corresponding to the subwindow 40 for each camera during a frame period. Thus, the frame rate may reach 1000 or more frames per second.

The image sensor system 10 outputs a set of overlapping subwindow images, each with the finger shifted slightly and the SLI projection pattern effectively modulated a small amount by the finger. The processing module determines a motion vector of the finger movement between subsequent subwindow images. A region of image pixels corresponding to object points on the finger can be tracked between the subwindow images. Due to the different placement of the object points within the enclosure aperture between subwindow images, the process needs to compensate for different camera angles and projection angles with respect to the object point. A phase map for the pixels is created during processing as discussed in more detail with respect to FIG. 14.

Figure 11:
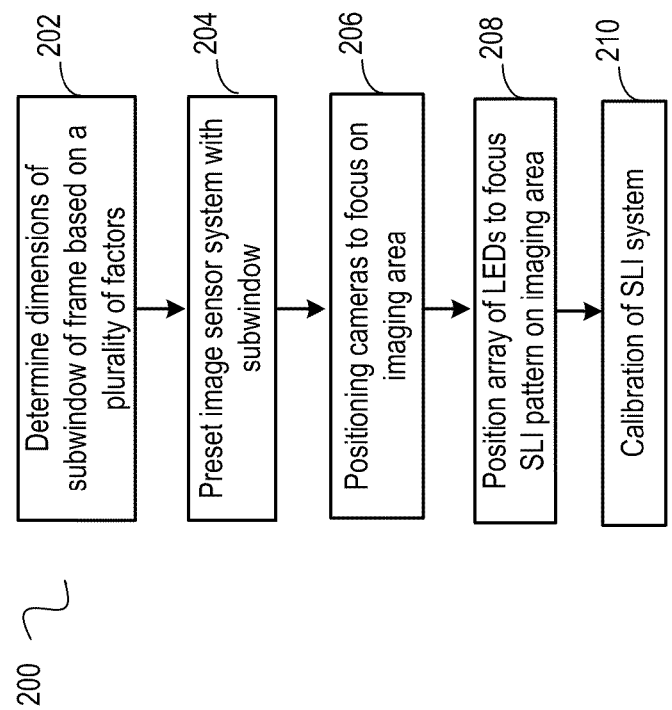
FIG. 11 illustrates a logic flow diagram of an embodiment of a method for calibrating an SLI system.

FIG. 11 illustrates a logic flow diagram of an embodiment of a method 200 for calibrating an SLI system. In step 202, the dimensions of a subwindow 40 of a camera frame 18 are determined based on one or more factors. As discussed with respect to FIG. 7, various factors include at least one of: frame rate, 3D object size, 3D object velocity, image resolution, SLI pattern cycle size, and aspect ratio. When the subwindow dimensions are determined, the image sensor system 102 is preset with the subwindow parameters in step 204. One or more image sensors are programmed to output the image data for camera pixels in the subwindow of the camera frame.

In step 206, one or more cameras in the image sensor system 102 are focused on the imaging area 28. In an embodiment, images from the subwindows 40 include a portion of a 3D object 10 in the imaging area. In step 208, the projector system 104 is focused to project an SLI pattern in the imaging area.

In step 210, the SLI system is calibrated. Fiducials from a calibration grid or other means, within the field of view of the image sensor system are detected. The real world coordinates of the fiducials from the calibration grid are known. From these known coordinates, the camera coordinates are determined along with the projector "phase" value. Then the following spatial coefficients are calculated:
1. Radial distortion of one or more cameras' lenses. The radial correction coefficient along with the optical axis coordinate is determined.
2. Radial distortion of the projector lenses. The radial correction coefficients and the optical axis of the projector are calculated.
3. Perspective coefficient matrix for mapping camera coordinates and projector phase to world coordinates, are determined.
4. Alignment error is calculated using the results of 1, 2 and 3. From this, transformation matrices are determined and used to further reduce errors.
5. Polynomial correction coefficients are calculated to remove remaining error in a surface merge after steps 1 thru 4 are performed.

The SLI system may be recalibrated at periodic intervals.

Figure 12:
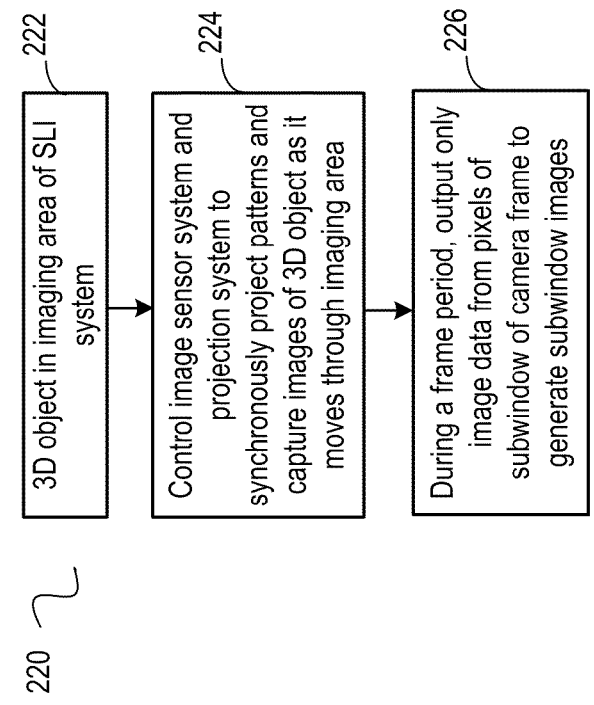
FIG. 12 illustrates a logic flow diagram of an embodiment of a method for image capture in an SLI system.

FIG. 12 illustrates a logic flow diagram of an embodiment of a method 220 for image capture in an SLI system. In step 222, a 3D object is in the imaging area of the SLI system. In an embodiment, the 3D object moves through the imaging area substantially along one axis. In another embodiment, the 3D object may remain motionless while the image sensor system and projection system move along an axis with respect to the 3D object. The SLI system captures a series of images of the 3D object moving through the imaging area in step 224. The image sensor system 102 and projector system 104 are synchronized such that the projector system 104 projects an SLI pattern slide onto the 3D object as the image sensor system captures an image. In an embodiment, the image sensor system 102 and projector system 104 are triggered by a clock input at a predetermined frame rate. During a frame period, the image sensor system 102 captures an image and outputs a subset of image data corresponding to camera pixels in a subwindow of a camera frame to generate subwindow images. The SLI system thus generates a series of subwindow images of the 3D object moving through the imaging area.

Figure 13:
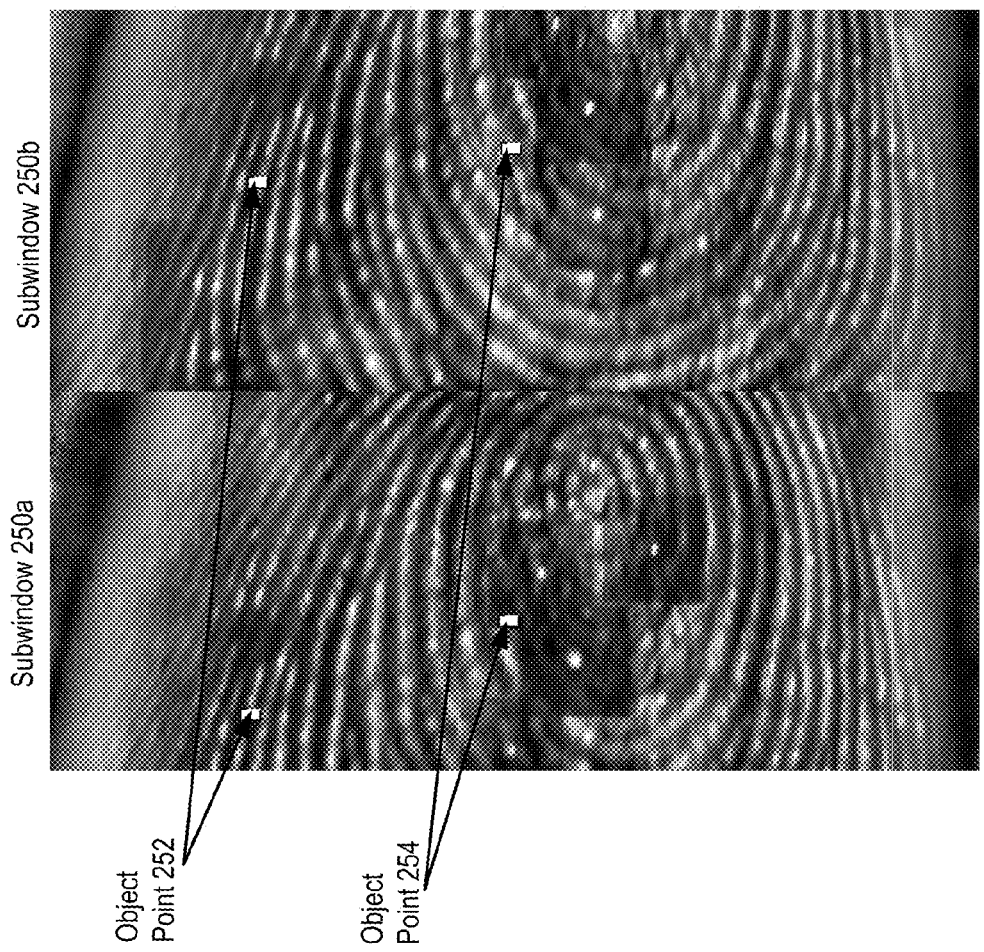
FIG. 13 illustrates a schematic block diagram of an embodiment of two subsequent subwindow images.

FIG. 13 illustrates a schematic block diagram of an embodiment of subwindow images 250a and 250b. The subwindow image 250a and 250b are subsequent images, e.g. subwindow image 250a was captured and then subwindow image 250b was captured. As seen in the subwindow images 250a and 250b, due to the movement of the 3D object, in this case a fingertip, object points 252 and 254 in the images are not in the same location. This movement between images requires certain processing during 3D reconstruction to create a 3D surface map.

Figure 14:
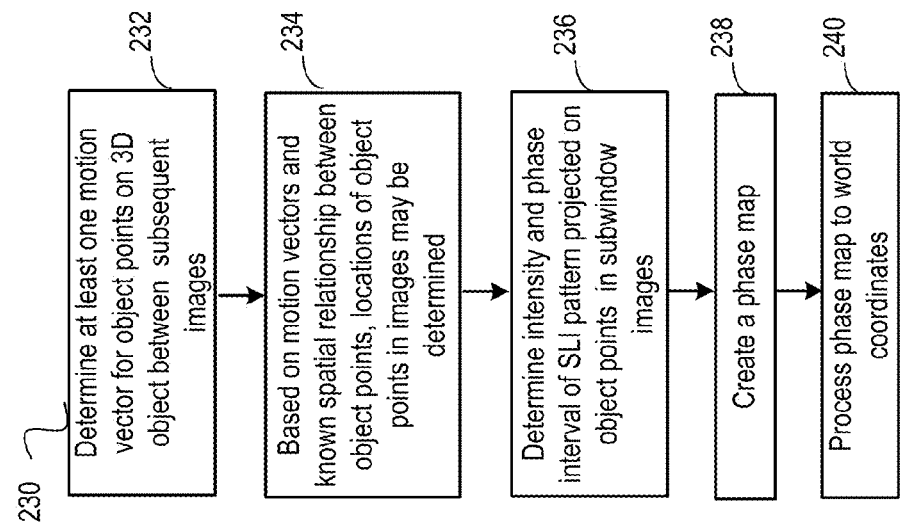
FIG. 14 illustrates a logic flow diagram of an embodiment of a method for processing subwindow images in an SLI system.

FIG. 14 illustrates a logic flow diagram of an embodiment of a method 230 for processing subwindow images in an SLI system to create a 3D surface map. In an embodiment, the SLI system implements the technique of phase measuring profilometry (PMP) as described above. However, due to the motion of the 3D object through the imaging area, an object point on the 3D object appears in different pixel positions in subsequent subwindow images as shown in FIG. 13. When multiple phase shifted, sine wave patterns are projected onto an unmoving object, the phase interval of the SLI pattern projected onto an object point is known. In an embodiment with a 3D object moving through a projected sine wave pattern, the phase interval of the sine wave pattern being projected onto an object point between subsequent images is not controlled and is dependent on the motion of the 3D object. Thus, prior to determining a PMP phase map, the positions of an object point in the subwindow images must be first determined so that the phase interval of the sine wave pattern being projected onto the object points in the images may be determined.

In step 232, the motion of the 3D object is tracked between subsequent subwindow images. In an embodiment, a cross-correlation between a subset of pixels in subsequent subwindow images is computed. Based on this cross-correlation, the motion vector of the 3D object can be generated based on the position of the correlation peaks.

In another embodiment, unique patterns from 3D object guides captured in subsequent subwindow images is used to help determine a motion vector of the 3D object movement. In another embodiment, individual motion vectors for certain object points are determined. The overall motion vector of the 3D object is then determined in response to the individual motion vectors.

In step 234, based on motion vectors and known spatial relationship between object points, locations of object points are determined in the images. Thus the phase interval of the sine wave pattern projected onto the object points in the images can also be determined.

In step 236, the intensity and phase of the SLI sine wave pattern projected onto an object point is determined. In step 238, a phase map is created for each pixel. By graphing the displacement of a pixel versus its intensity, a sine wave matching the spatial frequency of the SLI pattern projection will result. In step 240, from the phase map, the relative phase of the waveform for a pixel can be related to its relative Z displacement as in PMP techniques and the world coordinates for each pixel is determined. Collectively, the pixels result in a 3D surface map. The SLI system is thus able to create a 3D surface map of the 3D object based on the subwindow images.

Figure 15:
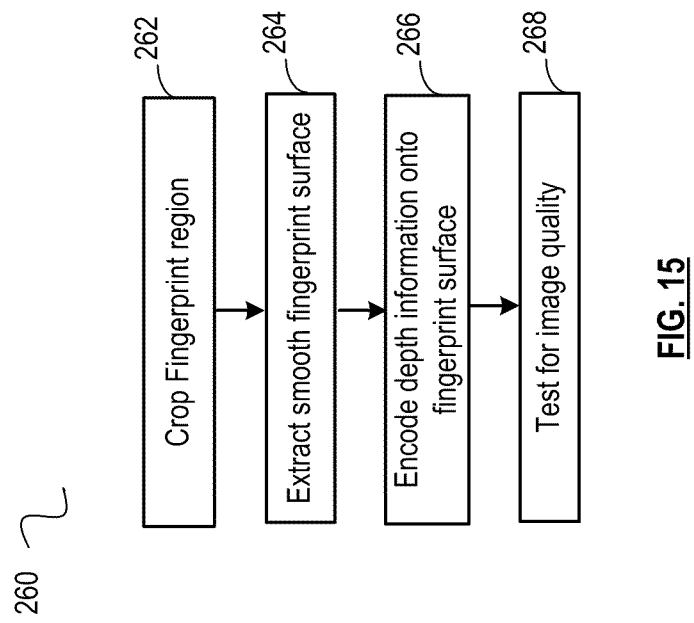
FIG. 15 illustrates a logic flow diagram of an embodiment of a method of operation for creating a two dimensional (2D) image.

FIG. 15 illustrates a logic flow diagram of an embodiment of a method 260 for creating a two dimensional (2D) representation of the 3D surface map in an SLI system. For example, in certain biometric applications, such as fingerprints, technical standards require certain 2D data representations that mimic standard 2D rolled fingerprinting methods. This process of creating a 2-D rolled equivalent print from a 3D surface map allows the SLI system to capture and store data in 3-D while at the same time remaining backward compatible with existing databases of fingerprints that meet NIST/FBI standards, specifically ANSI/NIST ITL 1-2000.

In step 262, the region of interest, such as the fingerprint is cropped from the 3D surface map. In step 264, the fingerprint surface is extracted from the 3D surface map. The virtual extraction is performed by smoothing the fingerprint ridges in the 3D surface map using a weighted non-linear least square algorithm. The difference between the 3D scan and the smooth model gives the required fingerprint surface.

In step 266, depth information is encoded onto the smooth fingerprint surface. In an embodiment, a springs algorithm is used where each point is treated as if it is connected to the neighboring points by springs and moved to a location where the energy in the springs is a minimum.

In step 268, image quality is tested using image quality metrics. In an embodiment, such metrics as Modulation Transfer Function (MTF) and Contrast Transfer Function (CTF) are tested. MTF provides a quality score that indicates the level of sharpness and detail possible with an imaging system. The MTF and CTF are tested to determine whether the metrics meet certain parameters. For example, CTF must be 0.5 for 10 cy/mm and MTF must meet 0.46 for 10 cy/mm. In addition, the geometric accuracy of the image is tested to determine whether errors are within predetermined parameters. For example, in an embodiment, deviation is less than 0.005 for 0.00<X<0.7 and less than 0.0071X for 0.07<X<1.5. In an embodiment, pixel noise is tested to determine whether within certain parameters. For example, in an embodiment, pixel noise must be below 3.5 for uniform light or dark gray target. In an embodiment, gray scale uniformity is tested whether it meets predetermined parameters. For example, the parameters may be less than 1 gray level for low reflectance target and less than 2 gray levels for high reflectance target. In an embodiment, another image quality parameter is the fingerprint images have a dynamic range of at least 128 gray-levels.

The use of subwindows in an SLI system provides a faster frame rate at high image resolutions. This allows for movement by the 3D object. In an embodiment, the SLI system is operable to project a single sine wave pattern onto a moving 3D object while capturing subwindow images. Using motion vectors along with PMP techniques, a 3D surface map of the 3D object from the subwindow images can be generated by the SLI system.

As may be used herein, the term "operable to" indicates that an item includes one or more of processing modules, data, input(s), output(s), etc., to perform one or more of the described or necessary corresponding functions and may further include inferred coupling to one or more other items to perform the described or necessary corresponding functions.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by one or multiple discrete components, networks, systems, databases or processing modules executing appropriate software and the like or any combination thereof.

What is claimed is:

1. A structured light imaging (SLI) system, comprising:
 a projection system that is operable to project a single SLI pattern into an imaging area;
 an image sensor system that is operable to capture at least one image of a 3D object moving through the imaging area in a frame period, wherein the image sensor system outputs a subset of camera pixels in the frame period to generate a subwindow image; and
 a processing module that is operable to create a 3D surface map of the 3D object using the subwindow image.

2. The SLI system of claim 1, wherein the subwindow image is generated by a subset of camera pixels corresponding to a subwindow of a camera frame.

3. The SLI system of claim 2, wherein dimensions of the subwindow are determined based on at least one of the following factors: frame rate, image resolution, 3D object size, 3D object velocity, SLI pattern cycle size, and aspect ratio.

4. The SLI system of claim 2, wherein dimensions of the subwindow are determined such that the image sensor system has a frame rate sufficient to reduce motion blur errors due to the movement of the 3D object and capture a sufficient number of images of each object point on the 3D object to generate a PMP 3D phase map.

5. The SLI system of claim 1, wherein the processing module is operable to create a 3D surface map of the 3D object using the subwindow image by determining a motion vector of the 3D object between subsequent subwindow images and determining locations of object points in subsequent subwindow images.

6. The SLI system of claim 5, wherein the processing module is further operable to create a 3D surface map of the 3D object based on determining phase intervals of the SLI pattern projected on object points in subsequent subwindow images.

7. An SLI system for imaging a fingerprint, comprising:
 a projection system that is operable to project a single SLI pattern onto a fingerprint in an imaging area;
 an image sensor system that is operable to capture a series of images of the fingerprint moving through the imaging area, wherein the image sensor system generates subwindow images of the fingerprint by outputting a subset of camera pixels in a frame period; and
 a processing module that is operable to create a 3D surface map of the fingerprint based on the subwindow images.

8. The SLI system of claim 7, wherein each subwindow image has rectangular dimensions, wherein width of the subwindow image corresponds to a finger width and the height is a fraction of an inch.

9. The SLI system of claim 8, wherein the projection system includes:
 an array of light emitting diodes (LEDs) operable to emit pulses of light; and an optical lens system to focus the pulses of light through the SLI pattern along a single axis corresponding to the width of the subwindow image.

10. The SLI system of claim 9, wherein the subwindow image includes a plurality of overlapping subwindow portions and wherein the image sensor system includes:
a plurality of image sensors, wherein each image sensor generates an overlapping subwindow portion.

11. The SLI system of claim 7, further comprising:
an enclosure forming an enclosure aperture, wherein the imaging area includes a portion of the enclosure aperture.

12. The SLI system of claim 7, wherein the processing module is operable to create a 3D surface map of the fingertip based on the subwindow images by determining a motion vector of the fingertip between subsequent subwindow images and determining locations of object points in subsequent subwindow images.

13. The SLI system of claim 12, wherein the processing module is further operable to create a 3D surface map of the fingertip based on determining phase intervals of the SLI pattern projected on object points in subsequent subwindow images.

14. The SLI system of claim 13, wherein the processing module is further operable to process the 3D surface map of the fingertip to create data for a two dimension (2D) rolled equivalent fingerprint.

15. The SLI system of claim 11, further comprising:
a guide for assisting movement of finger through the imaging area.

16. The SLI system of claim 12, wherein determining the motion vector of the fingertip between subsequent subwindow images includes:
generating a cross-correlation of a subset of pixels between adjacent subwindow images.

* * * * *